Nov. 30, 1937.　　　F. B. HEMMERT　　　2,100,956
FARMING IMPLEMENT
Filed May 28, 1936　　　3 Sheets-Sheet 1
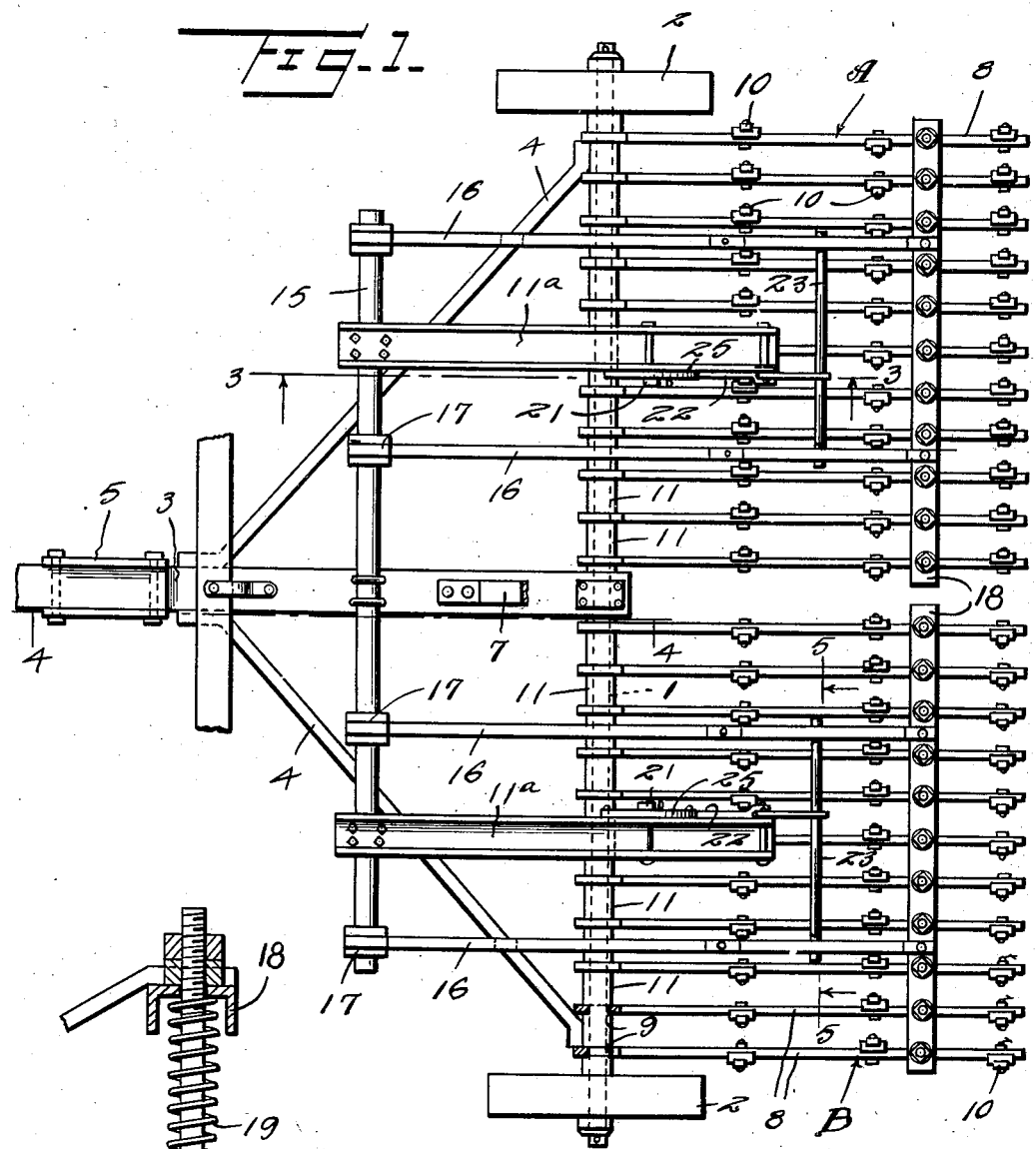
Inventor
Frank B. Hemmert
By
Attorney

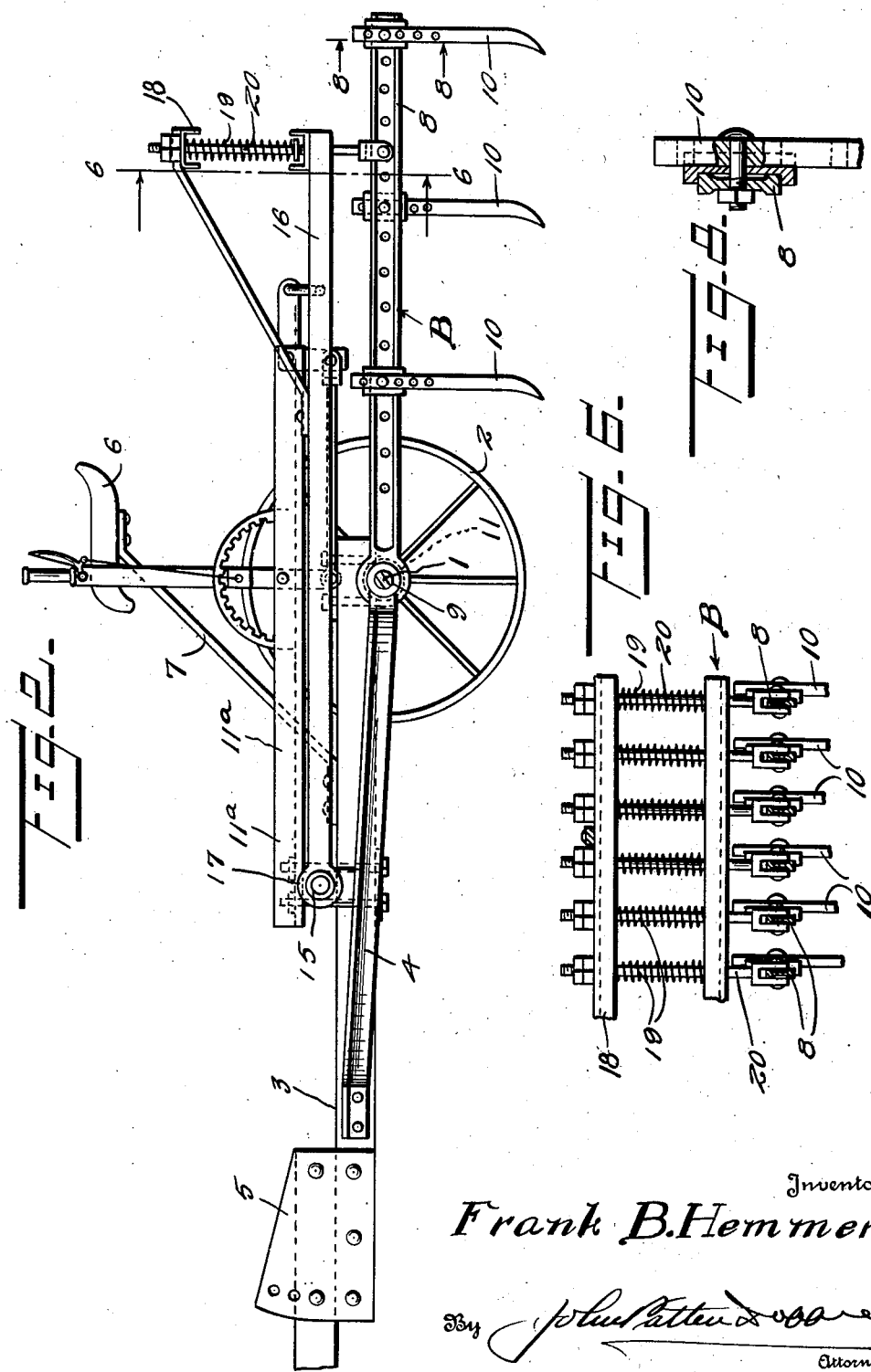

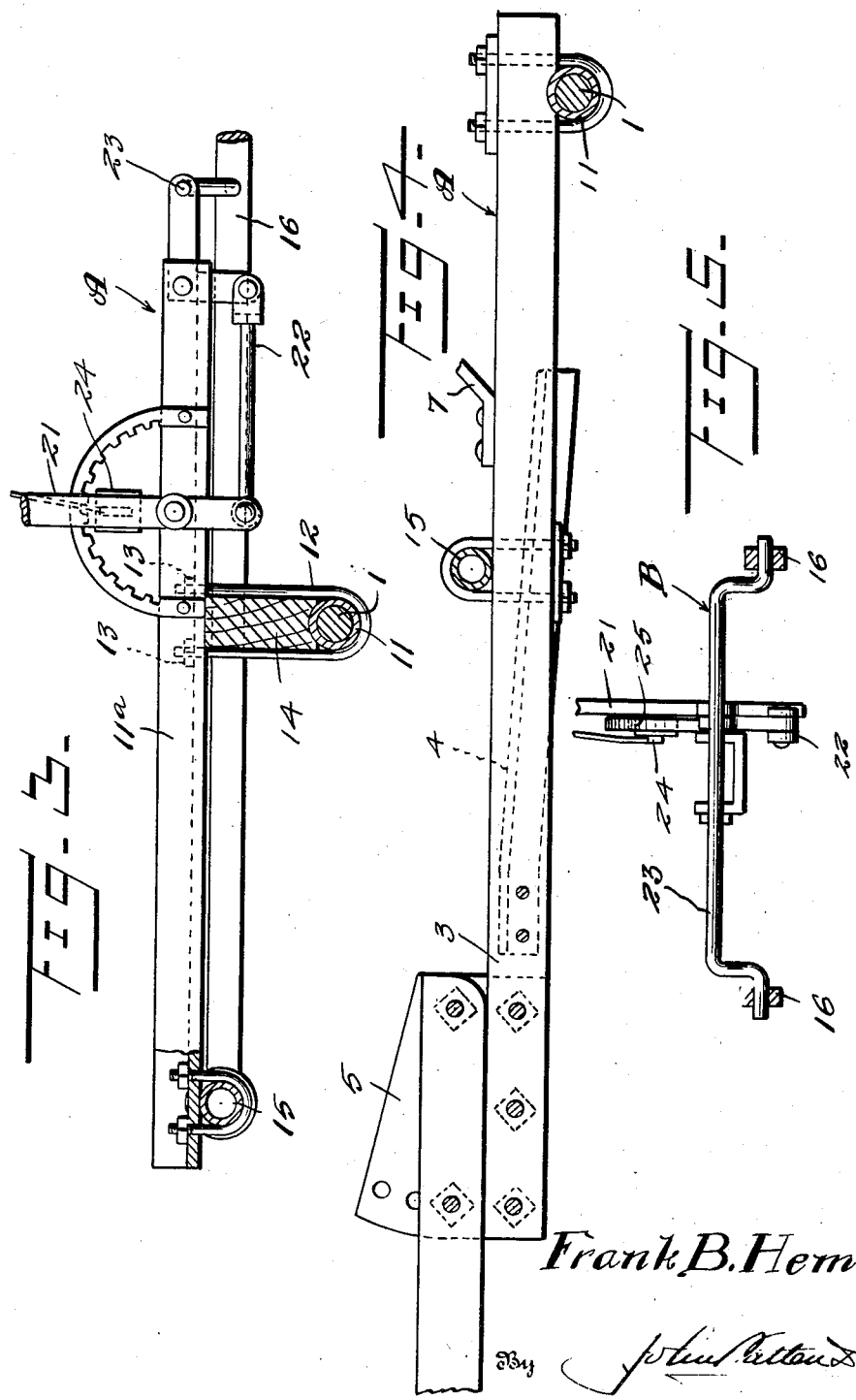

Patented Nov. 30, 1937

2,100,956

UNITED STATES PATENT OFFICE 2,100,956

FARMING IMPLEMENT

Frank B. Hemmert, St. Marys, Ohio

Application May 28, 1936, Serial No. 82,338

4 Claims. (Cl. 55—74)

This invention relates to new and useful improvements in farming implements.

The primary object of my invention is to provide an implement of this character that is susceptible of a multiplicity of uses, and some of the more important of these uses may be briefly enumerated as follows:

First: The machine may be used to cultivate corn up to a height of six inches.

Second: The implement will act as a mulch in wheat after sowing grass seed.

Third: The machine may be used as a weeder in cultivating corn and potatoes.

Fourth: The device may be used as a spike tooth harrow.

Fifth: The machine may be employed to mulch ground after a dashing rain.

Sixth: The device can be used in place of the ordinary rotary hoe.

With the foregoing and other objects in view that will appear as the nature of my invention is better understood, the same consists in the novel features of construction, combination, and arrangement of parts illustrated in the accompanying drawings and more particularly pointed out in the appended claims.

In the accompanying drawings, which are for illustrative purposes only and are therefore not drawn to scale:

Figure 1 is a side elevation of a farming implement embodying my improvements.

Figure 2 is a plan view.

Figure 3 is a central longitudinal section, taken on line 3—3 of Figure 1.

Figure 4 is a vertical transverse section, taken on line 4—4 of Figure 1, and the remaining views are details of various features of my invention.

Referring to the drawings for a more particular description of my invention, and in which drawings like parts are designated by like reference characters throughout the several views, the numeral 1 designates the main axle, 2 the supporting wheels at opposite ends of the main axle, 3 the tongue, 4 angle iron braces between the ends of the axle and the tongue, and 5 the adjustable tongue hitch, whereby the tongue may be raised or lowered, as desired. The numeral 6 represents a metal seat for the driver or operator and 7 the usual support for the former.

In carrying out my invention, I provide two corresponding independent harrow frames A and B, which are disposed at opposite sides of the tongue 3. Each harrow frame comprises a plurality of corresponding longitudinally disposed laterally spaced bars 8, formed at their forward ends with circular openings 9 to receive the main axle 1 and each carrying a gang or series of harrow teeth 10. The several bars of each harrow frame are held in properly spaced relation by the sleeves or bushings 11, disposed between the front swiveled ends of said bars, and the rear ends of the latter together with the harrow teeth, are susceptible of limited up and down movement in a vertical plane, as will more fully hereinafter appear.

The harrow frames may be raised or lowered at the will of the operator by certain lifting means, briefly described as follows:

Longitudinally disposed elongated supporting bars 11a are fastened by means of the U-shaped bolts and nuts 12 and 13, respectively, in association with the wooden blocks 14, to the main axle 1, and a tubular pipe or supporting bar 15 is mounted on and bolted at the center to the tongue 3 and bolted to and supported at its opposite ends to the supporting bars 11a. A lifting frame is provided for each harrow frame. Specifically, each lifting frame comprises a pair of longitudinally disposed laterally spaced lifting bars 16, pivoted at their front ends, as at 17, to the bar 15 and yieldably or resiliently connected at their rear ends by means of the cross bars 18, coil springs 19 and vertical plunger rods 20 to the harrow frames.

The harrow frames may be raised or lowered as desired by means of the hand levers 21, connecting rods 22 and transverse crank shafts 23, and held at the desired adjustment by the pawls and ratchets 24 and 25, respectively. Each harrow frame is controlled independently of the other, as will be apparent.

From the foregoing description, taken in connection with the drawings, it is thought that the construction, operation and advantages of my invention will be readily understood, without requiring a more extended explanation.

Various changes in the form, proportions and minor details of construction may be resorted to without departing from the principles or sacrificing any of the advantages of my invention, as defined in the appended claims.

Having described my invention, what I claim as new and desire to secure by Letters Patent, is:

1. In a farming implement of the character specified, a main axle, supporting wheels at the ends of the main axle, a tongue fastened to the axle, an adjustable tongue hitch, angle bars extending between the ends of the main axle and the tongue, harrow frames swiveled to the axle, teeth carried by said frames and means under the control of the operator for raising and lowering said harrow frames independently of each other.

2. In a farming implement of the character specified, a supporting frame, including a main axle, harrow frames swiveled at their front ends to the main axle, lifting frames for the harrow frames and means including hand levers and crank shafts connected to said levers for actuating the lifting frames independently of each other.

3. In a farming implement of the character specified, a supporting frame, including a main axle, a transverse supporting tube situated in front of the main axle, supporting means for said tube, harrow frames swiveled at their front ends to the axle, lifting frames for said harrow frames, said lifting frames pivoted at their front ends to the supporting tube and yieldably or resiliently connected at their rear ends to the harrow frames, and means under the control of the driver for operating the lifting frames independently of each other.

4. In a farming implement of the character specified, a supporting frame, including a main axle, a transverse supporting tube situated in front of the main axle, harrow frames swiveled at their front ends to the main axle and provided with gangs of harrow teeth, lifting frames for said harrow frames, said lifting frames pivoted at their front ends to the supporting tube, means under the control of the operator for actuating the lifting frames independently of each other to raise or lower the rear ends of the corresponding harrow frames, and coil springs and plunger rods for yieldably or resiliently connecting the rear ends of the lifting frames to the harrow frames.

FRANK B. HEMMERT.